United States Patent
Albano et al.

(10) Patent No.: US 9,342,328 B2
(45) Date of Patent: May 17, 2016

(54) MODEL FOR SIMULATION WITHIN INFRASTRUCTURE MANAGEMENT SOFTWARE

(75) Inventors: Daniel Thomas Albano, Apex, NC (US); Venugopala Chanrayappa, Bangalore (IN); Vijay Sukthankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 13/484,672

(22) Filed: May 31, 2012

(65) Prior Publication Data

US 2013/0325433 A1 Dec. 5, 2013

(51) Int. Cl.
*G06F 17/50* (2006.01)
*G06G 7/62* (2006.01)
*G06F 9/455* (2006.01)

(52) U.S. Cl.
CPC ............ *G06F 9/455* (2013.01); *G06F 9/45558* (2013.01)

(58) Field of Classification Search
CPC ............................. G06F 9/45558; G06F 9/455
USPC ................................................. 703/13, 22, 21
See application file for complete search history.

(56) References Cited

U.S. PATENT DOCUMENTS

| | | | |
|---|---|---|---|
| 2009/0300423 A1 | 12/2009 | Ferris | |
| 2011/0066597 A1* | 3/2011 | Mashtizadeh et al. | 707/640 |
| 2011/0145439 A1 | 6/2011 | Chaturvedi et al. | |
| 2011/0153812 A1 | 6/2011 | Yoon et al. | |
| 2012/0185913 A1* | 7/2012 | Martinez et al. | 726/1 |
| 2012/0240110 A1* | 9/2012 | Breitgand et al. | 718/1 |

OTHER PUBLICATIONS

Calheiros et al. "CloudSim: a toolkit for modeling and simulation of cloud computing environments and evaluation of resource provisioning algorithms". Published online Aug. 24, 2010 in Wiley Online Library (wileyonlinelibrary.com). 28 pages.*

Calheiros et al. "Modeling and Simulation of Scalable Cloud Computing Environments and the CloudSim Toolkit: Challenges and Opportunities". in High Performance Computing $ Simulation, 2009. 11 pages.*

Das, Krishnadhan, Virtual Cloud—A Cloud Environment Simulator, Department of Computer Science and Engineering, Indian Institute of Technology, Bombay, India, pp. 1-17, Oct. 2010.

(Continued)

*Primary Examiner* — Eunhee Kim
(74) *Attorney, Agent, or Firm* — George R. McGuire; Bond Schoeneck & King, PLLC; John Pivnichny (57) ABSTRACT

Systems and methods for simulation within a cloud computing environment. According to one embodiment, the system or method comprises a cloud computing environment with infrastructure management software and a cloud-based managed infrastructure. An interface is identified within infrastructure management software by first identifying a dataflow from the infrastructure management software to the infrastructure, and then, based on the dataflow, identifying a component within the infrastructure management software that is interacting with the infrastructure. A simulation class is then implemented using the identified interface, where the simulation class populates the infrastructure management software with metadata from an infrastructure database such that the infrastructure is simulated.

16 Claims, 5 Drawing Sheets

(56) References Cited

OTHER PUBLICATIONS

Accelerating Enterprise Cloud Infrastructure Deployments, A Better Way to Deploy Private Clouds, Oracle Executive Bref, Hardware and Software. Engineered to Work Together, http://www.oracle.com/us/solutions/oracle-opt-sols-cloud-inf-sol-brief.406108.pdf, pp. 1-4, 2011.

Garg, S., Buyya, R., NetworkCloudSim, Modelling Parallel Applications In Cloud Simulations, 2011 IEEE Fourth International Conference on Utility and Cloud Computing, DOI 10.1109/UCC.2011.24, pp. 105-113, 2011.

Calheiros, R., Ranja R., De Rose, C., Buyya, R , ClouoSim: A Novel Framework for Modeling and Simulation of Cloud Computing Infrastructures and Services, as of Mar. 14, 2009, pp. 1-9.

Mills, K., Filliben, J., Dabrowski, C., An Efficient Sensitivity Analysis Method for Large Cloud Simulations, Cloud Computing (CLOUD), 2011 IEEE International Conference on Cloud Computing, DOI 10.1109/CLOUD.2011.50, 2011, pp. 724-731.

\* cited by examiner

MODEL FOR SIMULATION WITHIN INFRASTRUCTURE MANAGEMENT SOFTWARE

BACKGROUND OF THE INVENTION

1. Field of the Invention

The present invention relates to Infrastructure-as-a-Service software, and, more specifically, to methods and systems for implementing simulations for Infrastructure-as-a-Service software.

2. Description of the Related Art

Infrastructure as a Service ("IaaS") cloud management software typically manages a set of hardware as a pool of resources and performs allocation and de-allocation of resources to or from the pre-defined pool. The resources often include a virtual (hypervisor) physical server (including CPU, memory, storage) and network, although a wide variety of other hardware and services are possible. The resources are often installed as large pools in a data center which can be either local or remote to the end user. The IaaS cloud management software also optionally includes a set of administrative and end user capabilities, and builds on a service driven model like service request management, process automation through workflows, and notification.

Service providers offer IaaS services to clients who purchase these services on a fixed fee or pay-as-you-go. The clients can access the IaaS services via the Internet, virtual networks, and/or local area networks.

Setting up IaaS cloud management software for development, testing, training, and education requires a managed infrastructure including physical servers, storage and networking, etc. Often, the IaaS cloud management software might not be sufficient unless there is a minimum set of managed hardware for the resource pool. There are several key challenges faced during the life cycle of IaaS software development, and when training others to use the software, including but not limited to: (i) requiring a substantial investment in managed infrastructure; (ii) requiring investment in hardware to host the IaaS cloud management software itself; (iii) requiring highly skilled resources to perform the setup and configuration of the hardware and managed software; (iv) the substantial amount of time required to prepare and configure the software take more time; and (v) the extensive testing that is consistently required in order to make the software stable and deliver expected results.

There have been previous attempts to address one or more of these issues. For example, the IaaS cloud management software can have multiple integrated components. These components can be tested individually, but due to the limited available managed infrastructure, testing may not be completed on all code paths (end-to-end). Further, since the time required of developers is so extensive, testers have been asked to use available resources, thereby limiting these activities to just one or two components. Additionally, these training sessions are often limited to theory only (for example, charts and demos), resulting in very little actual practical training.

BRIEF SUMMARY OF THE INVENTION

It is therefore a principal object and advantage of the present invention to provide a simple and cost-effective environment for testing and developing IaaS software.

It is another object and advantage of the present invention to reduce the investment required to host managed software and offer pay-as-you-go services.

It is yet another object and advantage of the present invention to significantly reduce the amount of time required to install and setup a managed infrastructure.

Other objects and advantages of the present invention will in part be obvious, and in part appear hereinafter.

Embodiments of the present invention comprise systems and methods for simulation within a cloud computing environment. According to one embodiment, a method for simulation within a cloud computing environment comprising infrastructure management software and a cloud-based managed infrastructure comprises the steps of: (i) identifying a dataflow from the infrastructure management software to the infrastructure; (ii) identifying, from the identified dataflow, which of a plurality of components of the infrastructure management software are interacting with the infrastructure; (iii) identifying, using the identified component, an interface that is interacting with the managed infrastructure; and (iv) implementing a simulation class for the identified interface, wherein the simulation class populates the infrastructure management software with metadata from an infrastructure database sufficient to allow the infrastructure management software to simulate the infrastructure. The method can further comprise the steps of: (v) preparing a virtual image of infrastructure management software in a second cloud computing environment; and (vi) implementing the infrastructure management software in the second cloud computing environment.

In another implementation, a non-transitory computer-readable storage medium containing program code for creating a simulation within a cloud computing environment comprising infrastructure management software and a cloud-based managed infrastructure, the computer program product comprising: (i) program instructions for identifying a dataflow from the infrastructure management software to the infrastructure; (ii) program instructions for identifying, from the identified dataflow, which of a plurality of components of the infrastructure management software are interacting with the infrastructure; (iii) program instructions for identifying, using the identified component, an interface that is interacting with the managed infrastructure; and (iv) program instructions for implementing a simulation class for the identified interface, wherein the simulation class populates the infrastructure management software with metadata from an infrastructure database sufficient to allow the infrastructure management software to simulate the infrastructure, and further wherein the simulation class does not interact with the managed infrastructure. The computer program product can further comprise: (v) program instructions for preparing a virtual image of infrastructure management software in a second cloud computing environment; and (vi) program instructions for implementing the infrastructure management software in the second cloud computing environment.

In another implementation, a system for simulation within a cloud computing environment includes: (i) an infrastructure management software; (ii) a cloud-based managed infrastructure; (iii) an infrastructure database; (iv) a dataflow from the infrastructure management software to the infrastructure; (v) one or more components of the infrastructure management software which, based on the dataflow, is interacting with the infrastructure; (vi) one or more interfaces that, based on the one or more interacting components, are interacting with the managed infrastructure; and (vii) a simulation class for the identified interface, wherein the simulation class populates the infrastructure management software with metadata from the infrastructure database sufficient to allow the infrastructure management software to simulate the infrastructure. The system can further comprise a virtual image of infrastructure management software prepared and implemented in a second cloud computing environment.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Referring now to the drawings, wherein like reference numerals refer to like parts throughout, according to one embodiment is provided a metadata model for implementation of a cloud simulator for IaaS cloud management software. The metadata model includes an interfacing layer and IaaS cloud management software with simulation as a virtual cloud hosted in a public or private cloud.

Figure 1:
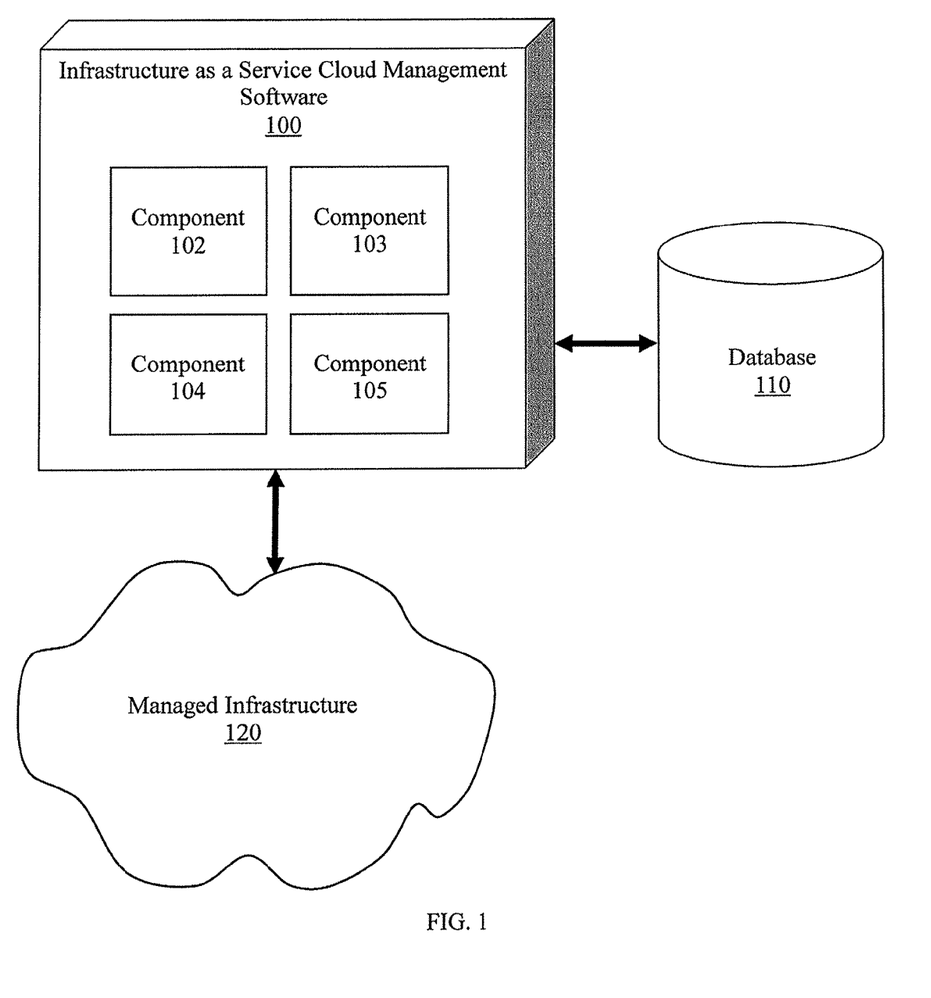
FIG. 1 is a schematic of a conventional model of IaaS management software with managed infrastructure.

For purposes of illustration, the current metadata data model for implementation of a Cloud Simulator and interfacing layer is explained by comparison to conventional IaaS management software (with its managed infrastructure as pool of resources). FIG. 1 depicts a model of IaaS management software 100 with managed infrastructure 120.

IaaS software can have multiple components, such as components 102 through 105 depicted in FIG. 1, and these components can be tested independently. There can also be simulators for individual components. Examples of IaaS software components include, but are not limited to, a service request manager, a process automation manager, and a provisioning manager. Many other types of components are possible.

Integration of software components 102-105 requires proper end-to-end integration testing, and this testing uses a managed infrastructure 120 for the cloud resource pool.

Often, IaaS software will be associated with one or more databases 110 to save details about the resource pool, including information about infrastructure, usage, allocation, de-allocation, and many other facets of the resource pool. For example, conventional IaaS management software 100 can be associated with a change and configuration management database, a data center model database, and/or many other types of databases.

Figure 2:
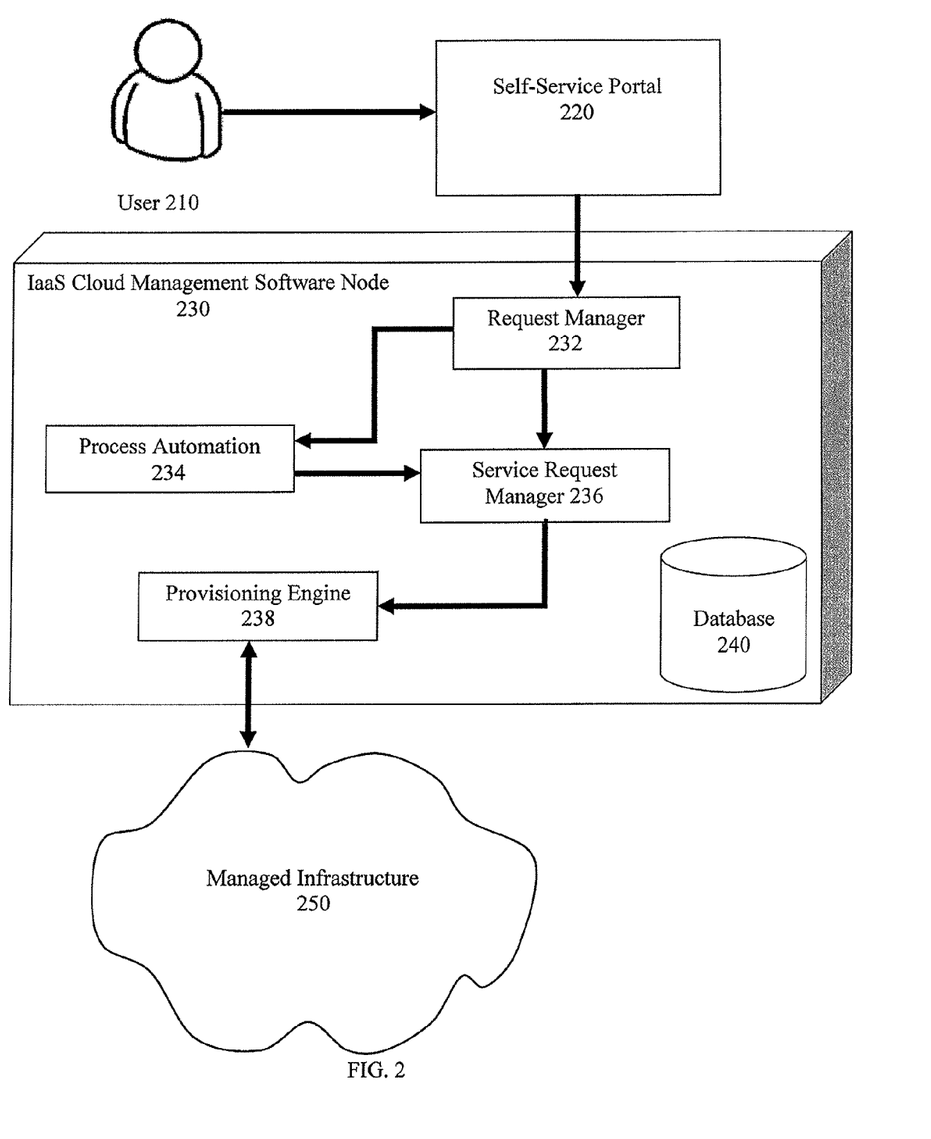
FIG. 2 is a schematic of dataflow of IaaS management software with managed infrastructure.

With proper investigation among the IaaS software components, the set of components that interact with the physical managed infrastructure can be identified. For example, FIG. 2 depicts an example of the dataflow where a provisioning engine 238 of an IaaS cloud management software node 230 interacts with the managed infrastructure 250.

Using the identified component(s), a set of interfaces which are independent of the managed infrastructure can be identified. For example, in FIG. 2, the provisioning engine 238 includes a set of logic operations which can be programmed to be similar to the interfaces of Java and/or C++ interfaces. In object-oriented programming, for example, an interface can be a means for unrelated objects to communicate with each other. According to certain embodiments, the interface can be a hardware and/or a software interface.

Next, there is implementation to the above-identified interfaces, which actually interact with the managed infrastructure for all provisioning and management actions. As an example, there can be hypervisor-specific workflows (such as those similar to java classes) which implement logical operations (or interfaces) which are designed for hypervisor-specific interactions.

Figure 3:
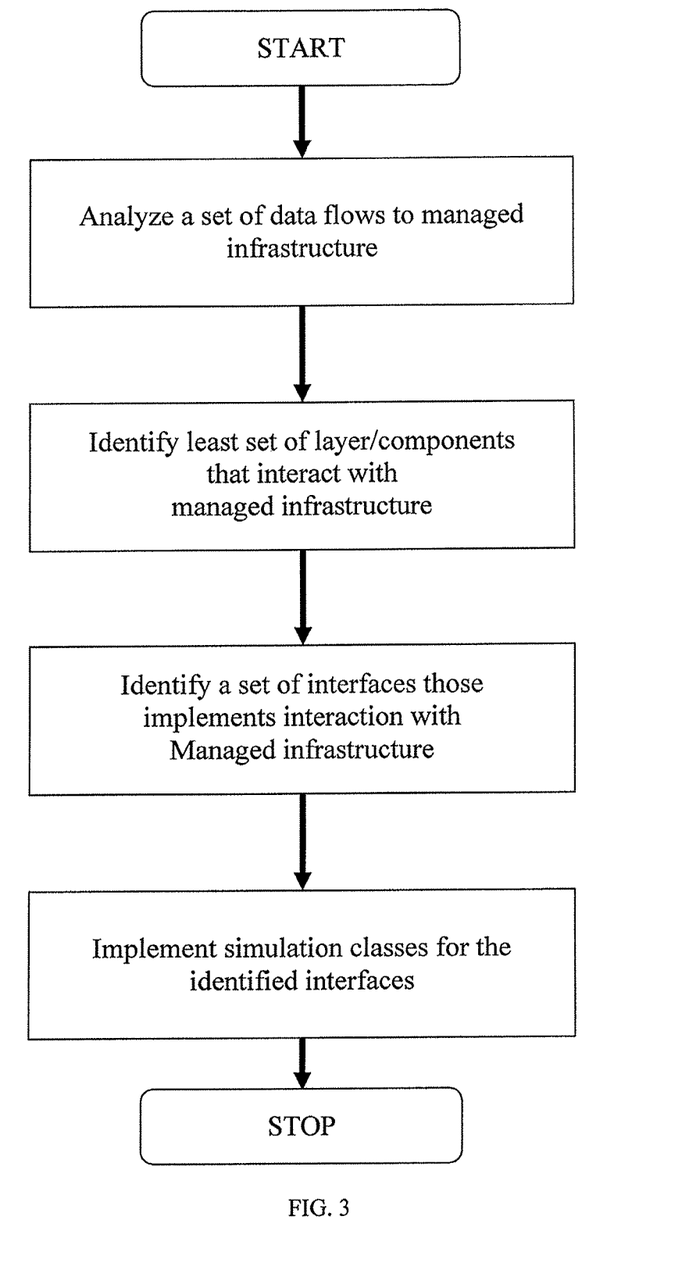
FIG. 3 is a flowchart of a model for IaaS management software according to one embodiment.

The model proposes an Interfacing layer in the IaaS cloud management software which exploits the metadata-based model for cloud simulation. FIG. 3 depicts the steps for implementing the model according to one embodiment. These steps can be adapted to be implemented for any IaaS software. At the first step, a set of dataflows to the managed infrastructure are analyzed. For example, many IaaS software packages will have one or more of the following key dataflows to the managed infrastructure:

a. Infrastructure discovery: an automated discovery run against the real managed infrastructure (servers, networking, storage, etc), and the discovered data is stored in a database, where most other components use this data; and/or b. Provisioning infrastructure: a set of actions run against the managed infrastructure to create, configure, and manage the infrastructure.

This is not meant to be a complete list, and many other types of dataflows to the managed infrastructure from the IaaS software package are possible.

"Dataflow" can include, but is not limited to, forms of communication used in parallel computing and/or object-oriented programming in which information (such as bytes, code, or other data) is sent to and received from other processes. Dataflow management can be especially important in systems that provide high-performance and/or continuous processing via concentrated data streams.

At the second step in FIG. 3, a set of layer(s) and/or component(s) that interact with the managed infrastructure are identified based at least in part on the information obtained in the previous step. This step will identify a set of components from which dataflow occurs. For example, an IaaS management software package may have a provisioning engine which has implementation for all dataflows to the managed infrastructure.

At the third step in FIG. 3, a set of interface(s) that implement the interaction with the managed infrastructure are identified. The previous steps will identify a dataflow and its associated layer with one or more interfaces. As explained above, the IaaS software will have implementations to these interfaces in order to interact with managed infrastructure. For example, an IaaS management software package may have a provisioning engine which has one or more of the following logic operations (interfaces):

HostPlatform.AddVLAN
HostPlatform.RemoveVLAN
HostPlatform.CreateVirtualServer
SoftwareInstallable.Install
Cloud.ImageRestore
Cloud.ImageBackup
Cloud.DeleteBackupImage
Device.Reboot
Device.PowerOn
Device.PowerOff
HostPlatform.DestroyVirtualServer This is not meant to be a complete list, and many other types of logic operations (interfaces) to and from the managed infrastructure from the IaaS software are possible.

Figure 4:
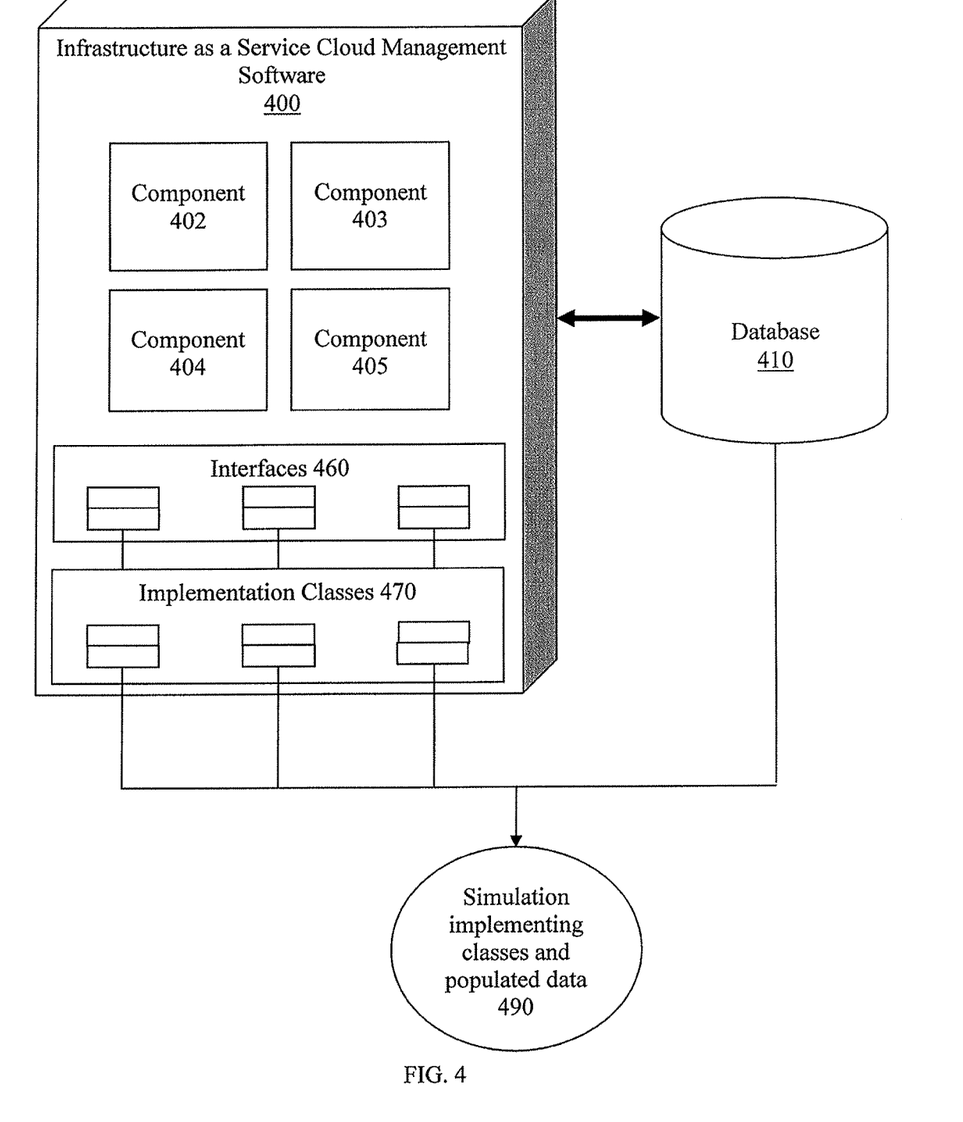
FIG. 4 is a schematic of IaaS management software with simulation by data population according to one embodiment.

At the fourth step in FIG. 3, simulation class(es) for the above-identified interfaces are implemented. At this step, classes for the interfaces identified in the previous step are implemented. These classes are also called simulated classes, and these simulated classes will not interact with managed infrastructure. Instead, they will populate the environment metadata required for the IaaS software. The population can include, for example, a pre-defined infrastructure data, post- and pre-creation of virtual servers, and many others. FIG. 4 depicts a simulation class diagram for simulation classes, and a list of some possible simulation classes are listed here:

CloudSimulator_Host_Add_VLAN HostPlatform.AddVLAN

CloudSimulator_Host_Remove_VLAN HostPlatform.RemoveVLAN

CloudSimulator_VM_Create HostPlatform.CreateVirtualServer     CloudSimulator_InstallVirtualMachine SoftwareInstallable.Install     CloudSimulator_ImageRestore Cloud.ImageRestore     CloudSimulator_ImageSave Cloud.ImageBackup     CloudSimulator_ImageDelete Cloud.DeleteBackupImage     CloudSimulator_VM_Reboot Device.Reboot     CloudSimulator_VM_PowerOn Device.PowerOn     CloudSimulator_VM_PowerOff Device.PowerOff     CloudSimulator_VM_Destroy HostPlatform.DestroyVirtualServer This is not meant to be a complete list, and many other types of simulation classes are possible.

FIG. 4 depicts a schematic of IaaS software with simulation by metadata population according to one embodiment of the invention. The embodiment includes, for example, IaaS cloud management software 400, various internal components 402-405, an associated database 410 which stores data about the managed infrastructure, implementation-independent interfaces 460, and simulation implementing classes 470 populated with the infrastructure data. As the outcome 490 of the model are the simulation implementing classes which interact with only the data and are populated with the required data. These classes do not interact with the physical infrastructure.

The data population helps to simulate the managed infrastructure for IaaS software, thereby resulting in the following: (i) eliminating the need and cost of investment required for managed infrastructure; (ii) eliminating the time to do a setup for managed infrastructure; (iii) lowering runtime costs; and (iv) helping run tests for end-to-end integration.

Figure 5:
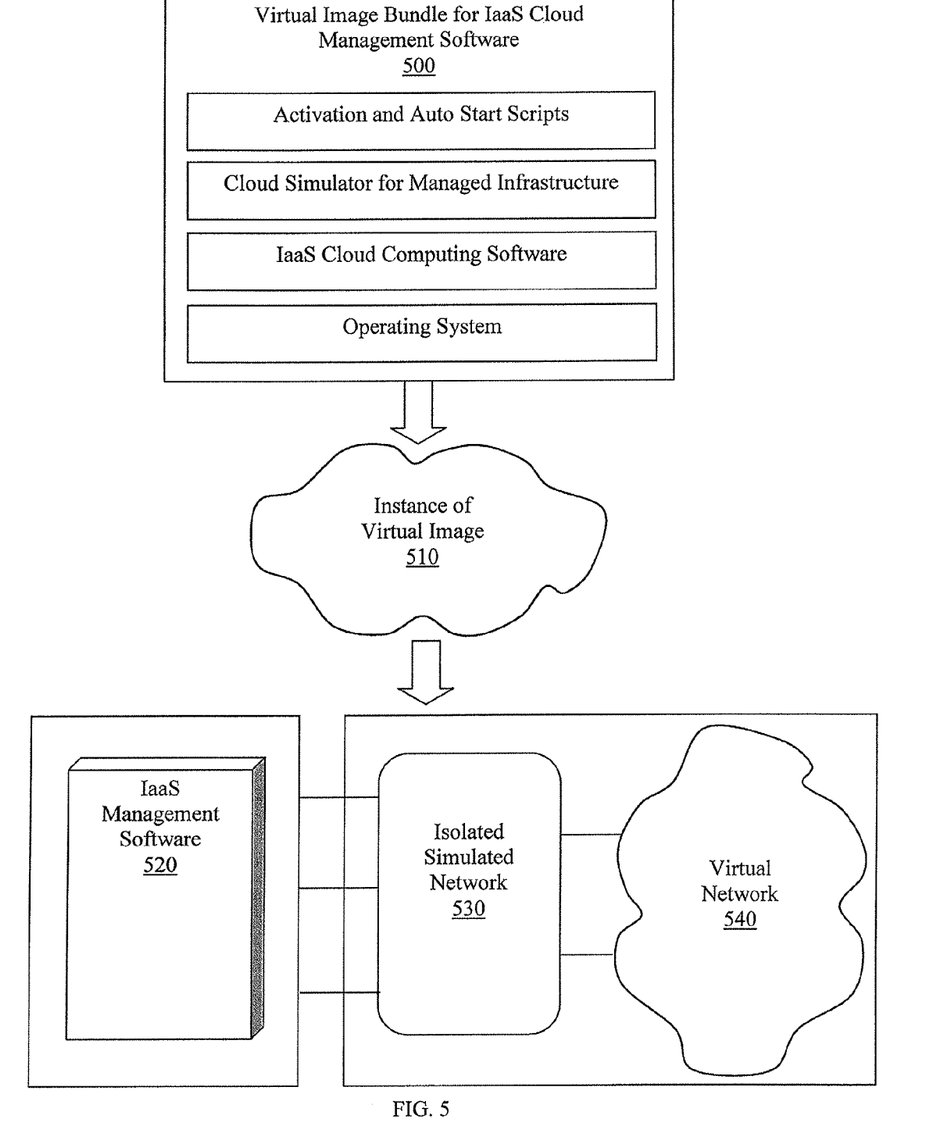
FIG. 5 is a schematic of IaaS management software in which an infrastructure simulator provides a virtual cloud environment where the infrastructure is metadata simulated.

FIG. 5 presents a high-level view of a virtual cloud implementation of the metadata method according to one embodiment. The infrastructure simulator provides a virtual cloud environment where, for example, physical/virtual servers, images, and networking are metadata simulated. According to one cost-effective approach for implementing IaaS software using simulation, the virtual cloud environment is presented within another public/private cloud.

As an initial step, an IaaS public or private cloud is identified. There are, for example, numerous available public IaaS clouds, including but not limited to IBM Smart Cloud Enterprise (SCE) and Amazon EC2.

As another step is preparing the virtual image. The procedure for preparing the virtual image depends on the image requirements of the selected public/private cloud, but could include, for example, one or more of the following:

Obtain the resources required for image preparation and create the virtual server;

Select and install the required operating system;

Install the IaaS software;

Install the managed server infrastructure simulator software;

Configure the servers, images, pools, and networking in the instance; and     Install activation and auto start scripts for the IaaS software and simulator.

This is not meant to be a complete list, and many other steps are possible.

As another step is registering the image. For example, the cloud provider could register the image into the catalog for users to request.

As another step is installing the IaaS cloud environment within the cloud. The installed IaaS software will interact with the managed infrastructure simulator, which eliminates the need for hardware resources required for the managed servers. The infrastructure simulator uses the idea of hardware simulation, and could include one or more of the following:

1. Simulated network: A simulated network within the scope of server is made available with the server. Other objects will obtain a network address from this simulated network. This simulated network is intended to provide the feel, data, and response of a real network.

2. Simulated hypervisor host: A host that simulates the hypervisor which has resourced CPU, memory, and storage. It has assigned IP address(es) and is active. A set of virtual servers can be created by dividing the resources across virtual servers. The IaaS can run discovery on these hypervisor hosts and populate the resource pools.

3. Simulated virtual image: A simulator virtual image which can be cloned to create a virtual server, and has attributes including but not limited to image type, image size, and operating system, among many others. The IaaS runs discovery to populate the list of images to the catalog.

4. Simulated virtual server: A server that simulates the virtual server which has simulator hypervisor host as a parent from which resources are acquired. The IaaS uses the images in the catalog to create the virtual servers, and on the user's request the IaaS software will create the virtual server by selecting the proper hypervisor host as a parent.

These simulated components are not meant to be a complete list, and many other simulated components are possible.

Although the present invention has been described in connection with a preferred embodiment, it should be understood that modifications, alterations, and additions can be made to the invention without departing from the scope of the invention as defined by the claims.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, insofar as various embodiments of the devices and/or processes are set forth in examples, block diagrams, and/or flowcharts, it is understood by those in the art that each function and/or operation within the examples, block diagrams, or flowcharts can be implemented, individually and/or collectively, by a wide range of hardware, software, firmware, or any combination thereof.

What is claimed is:

1. A method for simulation within a cloud computing environment comprising infrastructure management software and a cloud-based managed infrastructure, the method comprising the steps of:
   identifying a dataflow from the infrastructure management software to the infrastructure;
   identifying, from the identified dataflow, a subset of a plurality of components of the infrastructure management software are interacting with the infrastructure;
   identifying, using the identified subset of components, an interface that is interacting with the managed infrastructure;
   implementing a simulation class for the identified interface, wherein the simulation class populates the infrastructure management software with metadata from an infrastructure database, wherein the implemented simulation class and populated metadata allows the infrastructure management software to simulate the infrastructure with metadata, and further wherein the simulation class does not interact with the managed infrastructure.

2. The method of claim 1, further comprising the steps of:
   preparing a virtual image of infrastructure management software in a cloud computing environment; and
   implementing the infrastructure management software in the cloud computing environment.

3. The method of claim 2, wherein the step of preparing a virtual image of the infrastructure management software in a cloud computing environment comprises the step of installing infrastructure management software.

4. The method of claim 2, wherein the step of preparing a virtual image of the infrastructure management software in a cloud computing environment comprises the step of installing an operating system.

5. The method of claim 2, wherein the infrastructure management software installed in the cloud computing environment interacts with the infrastructure management software implementing the simulated infrastructure.

6. The method of claim 1, wherein the infrastructure database comprises information about one or more components of the cloud-based managed infrastructure.

7. A non-transitory computer-readable storage medium containing program code for creating a simulation within a cloud computing environment, the computer program product comprising:
   program code for identifying a dataflow from infrastructure management software to an infrastructure;
   program code for identifying, from the identified dataflow, a subset of a plurality of components of the infrastructure management software are interacting with the infrastructure;
   program code for identifying, using the identified subset of components, an interface that is interacting with the managed infrastructure;
   program code for implementing a simulation class for the identified interface, wherein the simulation class populates the infrastructure management software with metadata from an infrastructure database, wherein the implemented simulation class and populated metadata allows the infrastructure management software to simulate the infrastructure, and further wherein the simulation class does not interact with the managed infrastructure with metadata, and further wherein the simulation class does not interact with the managed infrastructure.

8. The computer-readable storage medium of claim 7, further comprising:
   program code for preparing a virtual image of infrastructure management software in a cloud computing environment; and
   program code for implementing the infrastructure management software in the cloud computing environment.

9. The computer-readable storage medium of claim 8, wherein the infrastructure management software installed in the cloud computing environment interacts with the infrastructure management software implementing the simulated infrastructure.

10. The computer-readable storage medium of claim 7, wherein the infrastructure database comprises information about one or more components of the cloud-based managed infrastructure.

11. A system for simulation within a cloud computing environment comprising:
    an infrastructure management software;
    a cloud-based managed infrastructure;
    an infrastructure database;
    a dataflow from the infrastructure management software to the infrastructure;
    a subset of a plurality of components of the infrastructure management software which, based on the dataflow, is interacting with the infrastructure;
    one or more interfaces that, based on the one or more interacting components, are interacting with the managed infrastructure; and
    a simulation class for the identified interface, wherein the simulation class populates the infrastructure management software with metadata from the infrastructure database wherein the implemented simulation class and populated metadata allows the infrastructure management software to simulate the infrastructure with metadata, and further wherein the simulation class does not interact with the managed infrastructure.

12. The system of claim 11, further comprising:
    a virtual image of infrastructure management software prepared and implemented in a cloud computing environment.

13. The system of claim 12, wherein the virtual image comprises installed infrastructure management software.

14. The system of claim 12, wherein the virtual image comprises an installed operating system.

15. The system of claim 12, wherein the infrastructure management software installed in the cloud computing environment interacts with the infrastructure management software implementing the simulated infrastructure.

16. The system of claim 11, wherein the infrastructure database comprises information about one or more components of the cloud-based managed infrastructure.

* * * * *